(12) United States Patent
Ling et al.

(10) Patent No.: US 11,876,197 B2
(45) Date of Patent: *Jan. 16, 2024

(54) VEHICLE AND POWER BATTERY HEATING APPARATUS AND METHOD THEREOF

(71) Applicant: BYD COMPANY LIMITED, Shenzhen (CN)

(72) Inventors: Heping Ling, Shenzhen (CN); Hua Pan, Shenzhen (CN); Yuxin Zhang, Shenzhen (CN); Guo Tian, Shenzhen (CN); Zhao Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 270 days.

This patent is subject to a terminal disclaimer.

(21) Appl. No.: 17/416,781

(22) PCT Filed: Dec. 20, 2019

(86) PCT No.: PCT/CN2019/127111
§ 371 (c)(1),
(2) Date: Jun. 21, 2021

(87) PCT Pub. No.: WO2020/125770
PCT Pub. Date: Jun. 25, 2020

(65) Prior Publication Data
US 2022/0077518 A1     Mar. 10, 2022

(30) Foreign Application Priority Data

Dec. 21, 2018 (CN) .......................... 201811574198.9

(51) Int. Cl.
*H01M 10/615* (2014.01)
*H01M 10/613* (2014.01)
(Continued)

(52) U.S. Cl.
CPC .......... *H01M 10/615* (2015.04); *B60L 58/27* (2019.02); *H01M 10/48* (2013.01);
(Continued)

(58) Field of Classification Search
CPC ............................................. H01M 10/60–657
See application file for complete search history.

(56) References Cited

U.S. PATENT DOCUMENTS

2012/0200241 A1    8/2012  Kojima et al.
2013/0111932 A1*   5/2013  Mishima ................. B60L 58/27
                                                                62/159
(Continued)

FOREIGN PATENT DOCUMENTS

CN       102627073 A      8/2012
CN       103392258 A      11/2013
(Continued)

OTHER PUBLICATIONS

CN-105762434-B English machine translation (Year: 2018).*
(Continued)

*Primary Examiner* — Scott J. Chmielecki
(74) *Attorney, Agent, or Firm* — Wenye Tan

(57) ABSTRACT

In a power battery heating method for a vehicle, when a current temperature value of a power battery is lower than a preset temperature value, and a heating condition of the power battery meets a preset condition, a three-phase inverter is controlled to cause a three-phase alternating current motor to generate heat according to heating energy, to heat a coolant flowing through the power battery, a preset quadrature-axis current that causes a torque value outputted by the motor to be an appropriate value is obtained, and a corresponding preset direct-axis current is obtained according to heating power of the power battery, so as to control, according to the preset direct-axis current and the preset
(Continued)

quadrature-axis current, the three-phase inverter to adjust a phase current of the three-phase alternating current motor in the heating process, where a direction of the preset direct-axis current changes periodically in the heating process.

20 Claims, 4 Drawing Sheets

(51) Int. Cl.
H01M 10/625 (2014.01)
H01M 10/635 (2014.01)
H01M 10/6567 (2014.01)
H01M 10/663 (2014.01)
B60L 58/27 (2019.01)
H02J 7/00 (2006.01)
H01M 10/48 (2006.01)

(52) U.S. Cl.
CPC ....... *H01M 10/486* (2013.01); *H01M 10/613* (2015.04); *H01M 10/625* (2015.04); *H01M 10/635* (2015.04); *H01M 10/6567* (2015.04); *H01M 10/663* (2015.04); *H02J 7/0047* (2013.01); *H02J 7/007194* (2020.01); *H01M 2220/20* (2013.01)

(56) References Cited

U.S. PATENT DOCUMENTS

| 2014/0012447 | A1 | 1/2014 | Gao et al. |
| 2016/0094173 | A1* | 3/2016 | Bonnett ............... H02P 21/22 318/400.02 |
| 2017/0174039 | A1 | 6/2017 | Schedel et al. |

| 2021/0351732 | A1* | 11/2021 | Shen .................. H01M 10/637 |
| 2022/0080858 | A1* | 3/2022 | Lian ........................ B60L 58/27 |
| 2022/0223937 | A1* | 7/2022 | Xu .......................... H02P 29/62 |
| 2022/0329184 | A1* | 10/2022 | Lian ........................ H02P 29/64 |

FOREIGN PATENT DOCUMENTS

| CN | 103427137 | A | | 12/2013 |
| CN | 103538487 | A | | 1/2014 |
| CN | 103560304 | A | | 2/2014 |
| CN | 104249629 | A | | 12/2014 |
| CN | 106160615 | A | | 11/2016 |
| CN | 106347067 | A | | 1/2017 |
| CN | 207021363 | U | | 2/2018 |
| CN | 108306078 | A | | 7/2018 |
| CN | 108736108 | A | | 11/2018 |
| CN | 105762434 | B | * | 12/2018 |
| CN | 112133987 | A | * | 12/2020 |
| DE | 102012201574 | A1 | | 9/2012 |
| DE | 102014011828 | A1 | | 2/2016 |
| JP | 2007028702 | A | | 2/2007 |
| JP | 2008189249 | A | | 8/2008 |
| JP | 2010272395 | A | | 12/2010 |
| JP | 2012007521 | A | | 1/2012 |
| JP | 2012165526 | A | | 8/2012 |
| JP | 2012166722 | A | | 9/2012 |
| JP | 2014230434 | A | | 12/2014 |
| JP | 2015080308 | A | | 4/2015 |
| WO | 2013174278 | A1 | | 11/2013 |

OTHER PUBLICATIONS

The World Intellectual Property Organization (WIPO) International Search Report for PCT/CN2019/127111 dated Mar. 20, 2020 6 pages (with translation).

* cited by examiner

VEHICLE AND POWER BATTERY HEATING APPARATUS AND METHOD THEREOF

CROSS-REFERENCE TO RELATED APPLICATIONS

This application is a national phase entry under 35 U.S.C. § 371 of International Application No. PCT/CN2019/127111, filed on Dec. 20, 2019, which claims priority to Chinese Patent Application No. 201811574198.9, entitled "VEHICLE AND POWER BATTERY HEATING APPARATUS AND METHOD THEREOF" and filed by BYD Co., Ltd. on Dec. 21, 2018, the entire content of all of which is incorporated herein by reference in its entirety.

FIELD

This application relates to the field of vehicle technologies, and in particular, to a vehicle and a power battery heating apparatus and method thereof.

BACKGROUND

In recent years, with the vigorous development of new-energy vehicles, a lithium-ion based power battery is widely applied. However, due to inherent characteristics of the battery, charging and discharging capabilities of the power battery are significantly reduced at low temperature, which affects use of the vehicles in a cold region.

To resolve such a problem, in the related art, the temperature of the power battery is obtained in real time mainly by using a temperature sensor, and when the temperature of the power battery meets a preset condition, a motor is controlled by using energy provided by the power battery, to run at zero torque, thereby heating the power battery. However, by using the method, although the power battery can be heated, the motor needs to be controlled to output zero torque, that is, a torque current is controlled to be zero, and a change direction of an amplitude value of a given direct-axis current is unchanged. In this way, for an upper leg and a lower leg of power switching devices of the same phase, due to the unchanged direction of the direct-axis current, only the upper leg (the lower leg) performs an on/off action, and the lower leg (the upper leg) remains off, easily leading to different service life of the upper leg and the lower leg of the same phase, which is not conducive to life evaluation of the power switching device.

Accordingly, an existing power battery heating method easily leads to a problem of uneven service life of power switching devices in an upper leg and a lower leg of the same phase.

SUMMARY

The present disclosure provides a vehicle and a power battery heating apparatus and method thereof, to resolve a problem that an existing power battery heating method easily leads to uneven service life of power switching devices in an upper leg and a lower leg of the same phase.

The present disclosure is implemented as follows. A first aspect of the present disclosure provides a power battery heating method. The power battery heating method includes:

obtaining a current temperature value of the power battery, and determining, when the current temperature value of the power battery is lower than a preset temperature value, whether a heating condition of the power battery meets a preset condition;

obtaining heating power of the power battery when the heating condition of the power battery meets the preset condition;

obtaining a preset quadrature-axis current, and obtaining a corresponding preset direct-axis current according to the heating power of the power battery, where a value of the obtained preset quadrature-axis current is a quadrature-axis current value that causes a torque value outputted by a three-phase alternating current motor to fall within a target range, and zero is not included in the target range; and controlling an on/off status of a power device in a three-phase inverter, so that the three-phase alternating current motor generates heat according to heating energy provided by a heating energy source, to heat a coolant flowing through the power battery, and controlling, according to the preset direct-axis current and the preset quadrature-axis current, the three-phase inverter to adjust a phase current of the three-phase alternating current motor in the heating process, where a direction of the preset direct-axis current changes periodically in the heating process.

A second aspect of the present disclosure provides a power battery heating apparatus. The power battery heating apparatus is configured to heat a power battery of a vehicle, and includes:

a three-phase inverter, connected to a positive electrode and a negative electrode of a heating energy source configured to provide heating energy;

a three-phase alternating current motor, where three phase coils of the three-phase alternating current motor are connected to three phase legs of the three-phase inverter; and a control module, where the control module is respectively connected to the three-phase inverter and the three-phase alternating current motor, and is configured to obtain a current temperature value of the power battery, and determine, when the current temperature value of the power battery is lower than a preset temperature value, whether a heating condition of the power battery meets a preset condition, and obtain heating power of the power battery when the heating condition of the power battery meets the preset condition; the control module is further configured to obtain a preset quadrature-axis current, and obtain a corresponding preset direct-axis current according to the heating power of the power battery, where a value of the obtained preset quadrature-axis current is a quadrature-axis current value that causes a torque value outputted by the three-phase alternating current motor to fall within a target range, and zero is not included in the target range; and the control module is further configured to control an on/off status of a power device in the three-phase inverter, so that the three-phase alternating current motor generates heat according to the heating energy provided by the heating energy source, to heat a coolant flowing through the power battery, and control, according to the preset direct-axis current and the preset quadrature-axis current, the three-phase inverter to adjust a phase current of the three-phase alternating current motor in the heating process, where a direction of the preset direct-axis current changes periodically in the heating process.

A third aspect of the present disclosure provides a vehicle, where the vehicle includes the power battery heating apparatus in the second aspect, and further includes a power battery, a coolant tank, a pump, and a water pipeline, the pump inputs a coolant in the coolant tank into the water pipeline according to a control signal, and the water pipeline passes through the power battery and the power battery heating apparatus.

The present disclosure provides a vehicle and a power battery heating apparatus and method thereof. In the power battery heating method, when a current temperature value of a power battery is lower than a preset temperature value, and a heating condition of the power battery meets a preset condition, a three-phase inverter is controlled to cause a three-phase alternating current motor to generate heat according to heating energy, to heat a coolant flowing through the power battery, a preset quadrature-axis current that causes a torque value outputted by the motor to be an appropriate value is obtained, and a corresponding preset direct-axis current is obtained according to heating power of the power battery, so as to control, according to the preset direct-axis current and the preset quadrature-axis current, the three-phase inverter to adjust a phase current of the three-phase alternating current motor in the heating process, where a direction of the preset direct-axis current changes periodically in the heating process, thereby making quantities of times of switching-on and switching-off of an upper leg and a lower leg of power switching devices of the same phase equal, and service life of devices balanced.

BRIEF DESCRIPTION OF THE DRAWINGS

To describe the technical solutions of the embodiments of the present disclosure more clearly, the following briefly introduces the accompanying drawings required for describing the embodiments or the related art. Apparently, the accompanying drawings in the following description show only some embodiments of the present disclosure, and a person of ordinary skill in the art may still derive other drawings according to the accompanying drawings without creative efforts.

DETAILED DESCRIPTION

To make the objectives, technical solutions, and advantages of the present disclosure clearer and more understandable, the present disclosure is further described in detail below with reference to the accompanying drawings. It should be understood that the embodiments described herein are merely used to explain the present disclosure but are not intended to limit the present disclosure.

To describe technical solutions in the present disclosure, the following provides descriptions by using specific embodiments.

Figure 1:
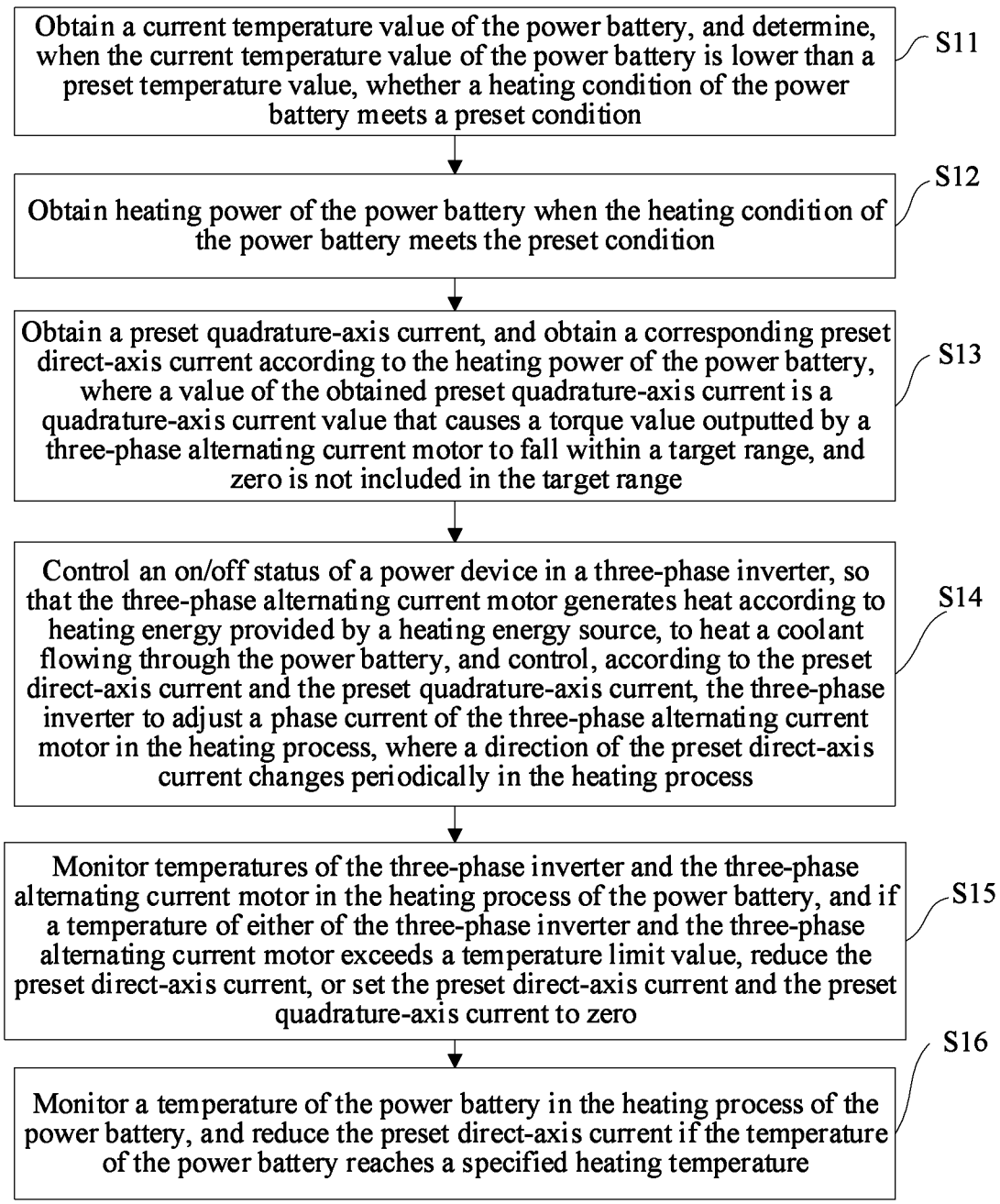
FIG. 1 is a schematic flowchart of a power battery heating method according to an embodiment of the present disclosure.

An embodiment of the present disclosure provides a power battery heating method. The power battery heating method is configured for heating a power battery of a vehicle, and in a heating process, a heat conduction path of the power battery is connected to and in communication with a heat conduction loop of a motor of the vehicle, to form a heat conduction loop. As shown in FIG. 1, the power battery heating method includes the following steps:

Step S11. Obtain a current temperature value of the power battery, and determine, when the current temperature value of the power battery is lower than a preset temperature value, whether a heating condition of the power battery meets a preset condition.

In the embodiments of the present disclosure, in a cold environment, when the vehicle is not used for a long time, a temperature of the power battery approaches an ambient temperature. With the decrease of the temperature, the performance of the power battery is further reduced, limiting charging and discharging capabilities, and further affecting the performance and use of the vehicle. Therefore, the power battery needs to be heated. However, before the power battery is heated, a current temperature value of the power battery needs to be obtained, and the temperature value is compared with a preset temperature value. If the current temperature value is lower than the preset temperature value, whether a heating condition of the battery meets a preset condition is further determined.

Specifically, in an implementation of the present disclosure, the determining whether a heating condition of the power battery meets a preset condition in step S11 is specifically:

identifying that the heating condition of the power battery meets the preset condition, in a case of determining that a current working status of the motor is a non-driving state, and determining that a fault status of the power battery, a fault status of the three-phase alternating current motor, a fault status of a motor controller, and a fault status of a heat conduction loop all indicate that no fault exists; and identifying that the heating condition of the power battery does not meet the preset condition, in a case of determining that the current working status of the motor is a driving state, or determining that any fault status in the fault status of the power battery, the fault status of the three-phase alternating current motor, the fault status of the motor controller, and the fault status of the heat conduction loop indicates that there is a fault.

In the embodiments of the present disclosure, when whether a heating condition of the power battery is met is determined, a current working status of the motor of the vehicle, whether a fault occurs in the power battery, whether a fault occurs in the three-phase alternating current motor, whether a fault occurs in a motor controller, and whether a fault occurs in a heat conduction loop specifically need to be determined. If the current working status of the motor is a non-driving state, and no fault occurs in the power battery, the three-phase alternating current motor, the motor controller, and the heat conduction loop, it indicates that the power battery may be heated; if the current working status of the motor is a driving state, or a fault occurs in any one of the power battery, the three-phase alternating current motor, the motor controller, and the heat conduction loop, it indicates that the power battery may not be heated. It should be noted that in the embodiments of the present disclosure, that a fault occurs in the heat conduction loop includes, but is not limited to, a problem such as damage in a communication valve or an insufficient medium in the heat conduction loop.

Further, in an implementation of the present disclosure, the power battery heating method further includes:

obtaining gear position information and motor speed information, and obtaining the current working status of the motor according to the gear position information and the motor speed information.

Specifically, when it is determined that a current gear position is a P gear position, and a motor speed is zero, it indicates that the current working status of the motor is a non-driving state; and when it is determined that the current gear position is not the P gear position, or the motor speed is not zero, it indicates that the current working status of the motor is a driving state.

In this implementation, gear position information and motor speed information are obtained, and the current working status of the motor is obtained according to the gear position information and the motor speed information. Therefore, when whether the heating condition of the power battery meets the preset condition is determined subsequently according to the working status of the motor, the gear position information and the motor speed information may be used for determination. When any of the conditions is not met, the power battery cannot be heated, to avoid that the performance of the vehicle is affected because the power battery is heated when the vehicle is in a normal traveling state.

Step S12. Obtain heating power of the power battery when the heating condition of the power battery meets the preset condition.

In the embodiments of the present disclosure, when it is determined that the heating condition of the power battery meets the preset condition, that is, the power battery may be heated, heating power of the power battery needs to be obtained. The heating power refers to power required for heating the power battery.

Step S13. Obtain a preset quadrature-axis current, and obtain a corresponding preset direct-axis current according to the heating power of the power battery, where a value of the obtained preset quadrature-axis current is a quadrature-axis current value that causes a torque value outputted by a three-phase alternating current motor to fall within a target range, and zero is not included in the target range.

In the embodiments of the present disclosure, after the power required for heating the power battery is obtained, a preset direct-axis current id and a preset quadrature-axis current iq further need to be obtained. The preset direct-axis current id may be obtained through searching according to the previously obtained heating power of the power battery. That is, there is a mapping relationship between the heating power of the power battery and the preset direct-axis current id, and after the heating power of the power battery is obtained, the corresponding preset direct-axis current id may be found according to the heating power. In addition, during obtaining of the preset quadrature-axis current iq, a relatively small torque value outputted by the three-phase alternating current motor may be obtained according to the obtained preset quadrature-axis current iq. The torque cannot cause the vehicle to move, and also cannot cause a damage to parts and components of a transmission mechanism of the vehicle. The torque only provides relatively small output torque to generate a pre-tightening force between gears of the transmission mechanism of the vehicle. The preset quadrature-axis current iq may be obtained through large amount of experiments.

Step S14. Control an on/off status of a power device in a three-phase inverter, so that the three-phase alternating current motor generates heat according to heating energy provided by a heating energy source, to heat a coolant flowing through the power battery, and control, according to the preset direct-axis current and the preset quadrature-axis current, the three-phase inverter to adjust a phase current of the three-phase alternating current motor in the heating process, where a direction of the preset direct-axis current changes periodically in the heating process.

In the embodiments of the present disclosure, the heating energy source may be an external charging device, such as a charging pile, or may be the power battery, which is not limited herein.

Further, after the preset direct-axis current id and the preset quadrature-axis current iq are obtained, an on/off status of a power device in a three-phase inverter may be controlled, that is, an on/off time of the power device in the three-phase inverter, that is, times required for switching on and switching off the power device, so that the three-phase alternating current motor generates heat according to heating energy, to heat a coolant flowing through the power battery, and the three-phase inverter is controlled according to the preset direct-axis current id and the preset quadrature-axis current iq to adjust a phase current of the three-phase alternating current motor in the heating process, thereby adjusting the heating power.

Figure 5:
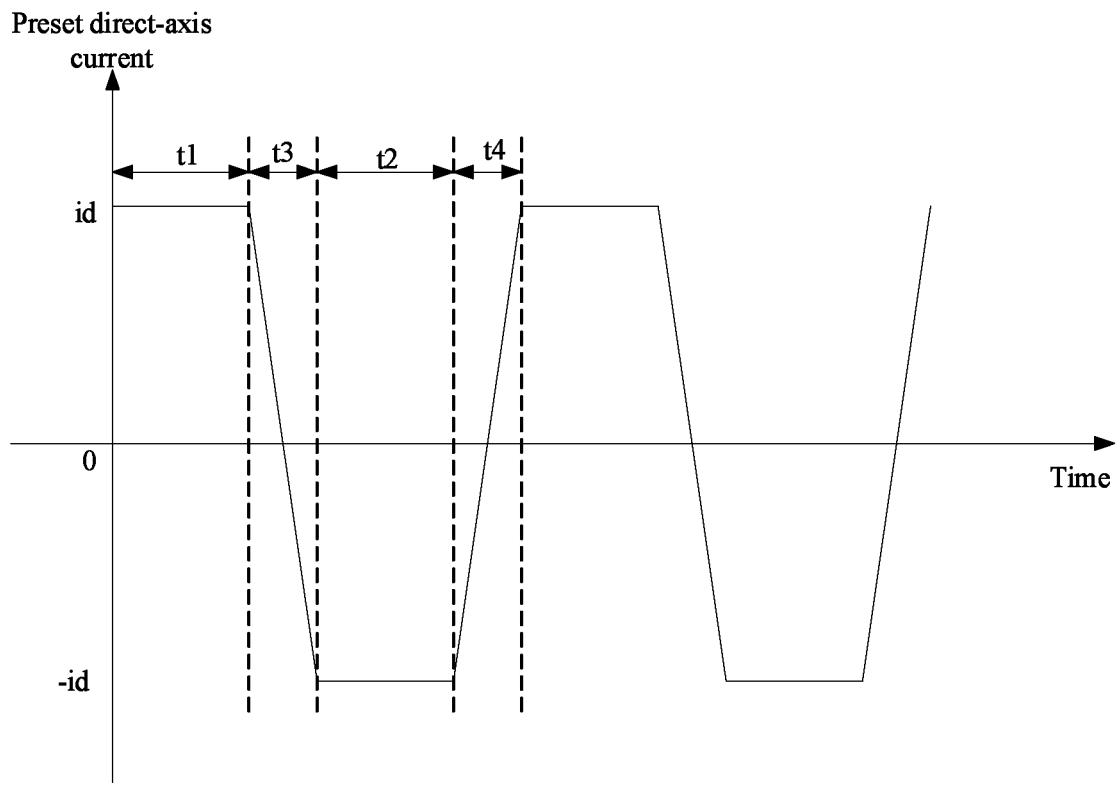
FIG. 5 is a schematic waveform diagram of a preset direct-axis current in a power battery heating method according to an embodiment of the present disclosure.

Specifically, as shown in FIG. 5, the heating process includes a plurality of heating periods, each heating period includes two preset heating durations t1 and t2, and two preset switching durations t3 and t4, the preset direct-axis current id is in a positive direction and has a constant amplitude value within the first preset heating duration t1, the preset direct-axis current id is in a negative direction and has a constant amplitude value within the second preset heating duration t2, the preset direct-axis current id changes from the positive direction to the negative direction and has a changing amplitude value within the first preset switching duration t3, and the preset direct-axis current id changes from the negative direction to the positive direction and has a changing amplitude value within the second preset switching duration t4. The first preset heating duration t1 is equal to the second preset heating duration t2, the first preset switching duration t3 is equal to the second preset switching duration t4, and the preset heating duration is greater than the preset switching duration. In the embodiments of the present disclosure, the preset heating duration is far greater than the preset switching duration, and a minimum preset switching duration needs to ensure that the vehicle has no obvious jitter.

Further, in the embodiments of the present disclosure, when the three-phase inverter is controlled according to the preset direct-axis current id and the preset quadrature-axis current iq to adjust the phase current of the three-phase alternating current motor, a current three-phase current value and position and angle information of a motor rotor of the three-phase alternating current motor need to be obtained before the power battery is heated, and the current three-phase current value is converted into a direct-axis current and a quadrature-axis current according to the position and angle information of the motor rotor, so as to control the three-phase inverter according to the direct-axis current, the quadrature-axis current, the preset direct-axis current, and the preset quadrature-axis current to adjust the phase current of the three-phase alternating current motor in the heating process, thereby heating the power battery, and ensuring that a relatively small torque value is outputted at a motor shaft.

In this implementation, parameters such as a three-phase current value and position and angle information of a motor rotor of the three-phase alternating current motor before the heating are obtained, to obtain a direct-axis current and a quadrature-axis current according to the obtained parameters, facilitating in controlling the three-phase inverter according to the direct-axis current, the quadrature-axis current, the preset direct-axis current, and the preset quadrature-axis current to adjust the phase current of the three-phase alternating current motor in the heating process, thereby adjusting the heating power.

Further, in an implementation of the present disclosure, a specific process of obtaining the direct-axis current and the quadrature-axis current according to the position and angle information of the motor rotor and the current three-phase current value is:

after the current three-phase current value and the position and angle information of the motor rotor of the three-phase alternating current motor are obtained before the power battery is heated, transforming the current three-phase current value from a natural coordinate system to a static coordinate system, and converting the current three-phase current value in the static coordinate system into a direct-axis current and a quadrature-axis current in a synchronous rotating coordinate system according to the position and angle information of the motor rotor.

In this implementation, the current three-phase current value is transformed from a natural coordinate system to a static coordinate system, and the current three-phase alternating current value in the static coordinate system is converted into a direct-axis current and a quadrature-axis current in a synchronous rotating coordinate system according to the position and angle information of the motor rotor, so that the three-phase inverter may be controlled according to the obtained direct-axis current and quadrature-axis current to adjust the phase current of the three-phase alternating current motor based on the standard of the same coordinate system, thereby improving the accuracy of the adjustment process.

Further, in an implementation of the present disclosure, after the direct-axis current and the quadrature-axis current are obtained, the direct-axis current and the quadrature-axis current are respectively compared with the preset direct-axis current id and the preset quadrature-axis current iq, to adjust the direct-axis current and the quadrature-axis current according to the preset direct-axis current id and the preset quadrature-axis current iq, thereby controlling the three-phase inverter according to the preset direct-axis current id and the preset quadrature-axis current iq. After the direct-axis current and the quadrature-axis current are adjusted according to the preset direct-axis current id and the preset quadrature-axis current iq, a direct-axis voltage Ud and a quadrature-axis voltage Uq may be obtained according to data obtained by decoupling an adjustment result. After the direct-axis voltage Ud and the quadrature-axis voltage Uq are obtained, coordinate transformation is performed on the direct-axis voltage Ud and the quadrature-axis voltage Uq to obtain a first voltage $U_\alpha$ and a second voltage $U_\beta$, so as to obtain a switching signal according to the first voltage $U_\alpha$ and the second voltage $U_\beta$, thereby controlling the three-phase inverter according to the switching signal to adjust the phase current of the three-phase alternating current motor.

In this implementation, the obtained direct-axis current and quadrature-axis current are adjusted according to the preset direct-axis current and the preset quadrature-axis current, to obtain a corresponding adjustment result, and a series of changes are performed on the adjustment result, to obtain a switching signal of the three-phase inverter, that is, an on/off time of the power device in the three-phase inverter, so that the three-phase inverter is controlled according to the switching signal to adjust the phase current of the three-phase alternating current motor, thereby implementing closed-loop control of the three-phase alternating current motor, and adjusting the heating power, which improves the effectiveness in the heating process of the power battery, and reduces a loss in parts and components such as the motor.

Step S15. Monitor temperatures of the three-phase inverter and the three-phase alternating current motor in the heating process of the power battery, and if a temperature of either of the three-phase inverter and the three-phase alternating current motor exceeds a temperature limit value, reduce the preset direct-axis current, or set the preset direct-axis current to zero.

In the embodiments of the present disclosure, in the heating process of the power battery, any device may be damaged in a case of an excessively high temperature. Therefore, temperatures of the three-phase alternating current motor and the power device in the three-phase inverter need to be monitored in real time. If it is detected that a temperature of either of the three-phase inverter and the three-phase alternating current motor exceeds a temperature threshold, a current amplitude value of the preset direct-axis current id is reduced or the preset direct-axis current id is set to zero.

In the embodiments of the present disclosure, if it is determined that the temperature of either of the three-phase inverter and the three-phase alternating current motor exceeds the temperature limit value, the power battery heating method further includes: setting the preset quadrature-axis current to zero.

In this implementation, in the heating process of the power battery, temperatures of the three-phase inverter and the three-phase alternating current motor are monitored in real time, so that when a temperature of either of the three-phase inverter and the three-phase alternating current motor exceeds a temperature threshold, the preset direct-axis current id is reduced, or the preset direct-axis current id and the preset quadrature-axis current iq are set to zero, and values of phase currents flowing through three phase windings of the three-phase alternating current motor are also reduced or become zero. In this way, the heating power of the motor is reduced, and thus a temperature of a power unit in the three-phase inverter and temperatures of the three phase windings of the three-phase alternating current motor are reduced, so that all the parts and components of the vehicle are not damaged while ensuring the heating effect.

Step S16. Monitor a temperature of the power battery in the heating process of the power battery, and reduce the preset direct-axis current if the temperature of the power battery reaches a specified heating temperature.

In the embodiments of the present disclosure, when a temperature of the power battery reaches a specified heating temperature, it indicates that there is no need to heat the power battery. In this case, it needs to stop heating the power battery, that is, reduce the preset direct-axis current id, until the preset direct-axis current id is reduced to zero.

In this implementation, a temperature of the power battery is monitored in real time in the heating process, and when the temperature of the power battery reaches a specified heating temperature, the preset direct-axis current id is reduced, to effectively avoid overheating of the power battery, and avoid a damage to the power battery, thereby prolonging the service life of the power battery.

In an implementation of the present disclosure, the power battery heating method further includes:

obtaining required heating power of the power battery in real time in the heating process of the power battery, and adjusting a value of the preset direct-axis current according to the required heating power.

In the embodiments of the present disclosure, the adjusting a value of the preset direct-axis current according to the required heating power refers to adjusting heating power according to a difference between a preset target heating temperature and a current temperature of the power battery, where a larger difference indicates larger heating power, and larger power indicates a larger amplitude value of the preset direct-axis current. Specifically, when relatively large power is required, that is, a current battery temperature of the power battery is relatively low, for example, when a difference between the current temperature and a target temperature that needs to be reached during heating exceeds 10° C., heating is performed by using relatively large power. In this case, an amplitude value of the preset direct-axis current id is increased. When relatively low power is required, that is, a current battery temperature of the power battery is relatively large, for example, when a difference between the current temperature and a target temperature that needs to be reached during heating is less than 10° C., heating is performed by using relatively low power. In this case, an amplitude value of the preset direct-axis current id is reduced.

In this implementation, required heating power of the power battery is obtained in real time in the heating process, and the preset direct-axis current id and the preset quadrature-axis current iq are adjusted according to the required heating power, to effectively avoid overheating of the power battery, and avoid a damage to the power battery, thereby prolonging the service life of the power battery.

In an implementation of the present disclosure, the power battery heating method further includes:

setting the preset direct-axis current to zero in a case of determining that any fault status in the fault status of the power battery, the fault status of the three-phase alternating current motor, the fault status of the motor controller, and the fault status of the heat conduction loop indicates that there is a fault.

In the embodiments of the present disclosure, in a case of determining that any fault status in the fault status of the power battery, the fault status of the three-phase alternating current motor, the fault status of the motor controller, and the fault status of the heat conduction loop indicates that there is a fault, it indicates that the power battery cannot be heated, and heating of the power battery should be stopped, that is, the preset direct-axis current and the preset quadrature-axis current are set to zero.

in a case of determining that any fault status in the fault status of the power battery, the fault status of the three-phase alternating current motor, the fault status of the motor controller, and the fault status of the heat conduction loop indicates that there is a fault, the power battery heating method further includes: setting the preset quadrature-axis current to zero.

In this implementation, in a case of determining that any fault status in the fault status of the power battery, the fault status of the three-phase alternating current motor, the fault status of the motor controller, and the fault status of the heat conduction loop indicates that there is a fault, heating of the power battery is stopped, to effectively avoid a damage to the power battery, thereby prolonging the service life of the power battery.

Figure 2:
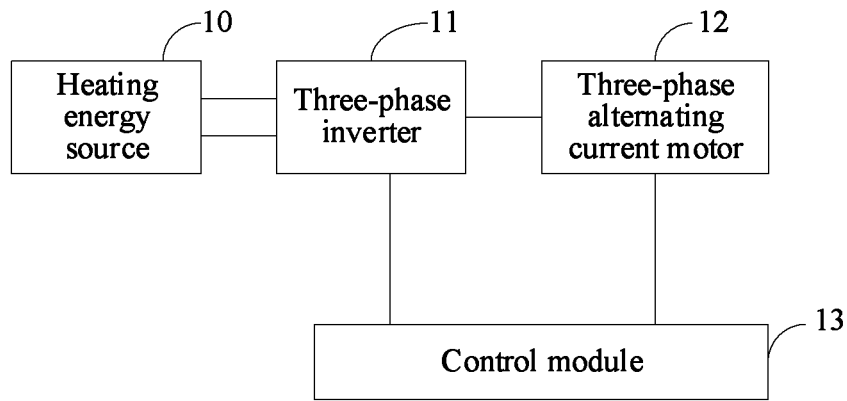
FIG. 2 is a schematic structural diagram of a power battery heating apparatus according to an embodiment of the present disclosure.

An embodiment of the present disclosure provides a power battery heating apparatus, configured to heat a power battery of a vehicle. As shown in FIG. 2, the power battery heating apparatus includes:

a three-phase inverter 11, connected to a positive electrode and a negative electrode of a heating energy source 10 configured to provide heating energy;

a three-phase alternating current motor 12, where three phase coils of the three-phase alternating current motor 12 are connected to three phase legs of the three-phase inverter 11; and a control module 13, where the control module 13 is respectively connected to the three-phase inverter 11 and the three-phase alternating current motor 12, and is configured to obtain a current temperature value of the power battery, and determine, when the current temperature value of the power battery is lower than a preset temperature value, whether a heating condition of the power battery meets a preset condition, and obtain heating power of the power battery when the heating condition of the power battery meets the preset condition; the control module 13 is further configured to obtain a preset quadrature-axis current iq, and obtain a corresponding preset direct-axis current id according to the heating power of the power battery, where a value of the obtained preset quadrature-axis current iq is a quadrature-axis current value that causes a torque value outputted by the three-phase alternating current motor 12 to fall within a target range, and zero is not included in the target range; and the control module 13 is further configured to control an on/off status of a power device in the three-phase inverter 11, so that the three-phase alternating current motor 12 generates heat according to the heating energy provided by the heating energy source, to heat a coolant flowing through the power battery, and control, according to the preset direct-axis current id and the preset quadrature-axis current iq, the three-phase inverter to adjust a phase current of the three-phase alternating current motor 12 in the heating process, where a direction of the preset direct-axis current id changes periodically in the heating process.

The heating energy source 10 may be implemented by using an external power supply device such as a charging pile, or may be the power battery itself. That is, the heating energy provided by the heating energy source 10 may be outputted by the power battery, or may be outputted by a direct current charger, or may be outputted by an alternating current charger after rectifying, which is not specifically limited herein. The three-phase inverter 11 has four working modes, which is determined by the control module 13. When configured to drive the vehicle, the three-phase inverter 11 works in an inverter mode; when configured to boost for charging, the three-phase inverter 11 works in a boost mode; when configured to heat a battery, the three-phase inverter 11 works in a heating mode; when needing to supply power to the outside, the three-phase inverter 11 works in a changing voltage mode. Only a case in which the three-phase inverter 11 works in the heating mode is described in detail in the embodiments of the present disclosure. The three-phase inverter 11 includes six power switching units. The power switch may be a transistor, an IGBT, or a MOS transistor, or other device types. Two power switching units form a phase leg, and a total of three phase legs are formed. A connecting point between two power switching units on each phase leg is connected to a phase coil in the three-phase alternating current motor 12. The three-phase alternating current motor 12 includes three phase coils, and the three phase coils are connected to one midpoint. The three-phase alternating current motor 12 may be a permanent magnet synchronizing motor, an asynchronous motor, or the like. A type of the three-phase alternating current motor is not specifically limited in the present disclosure.

Figure 3:
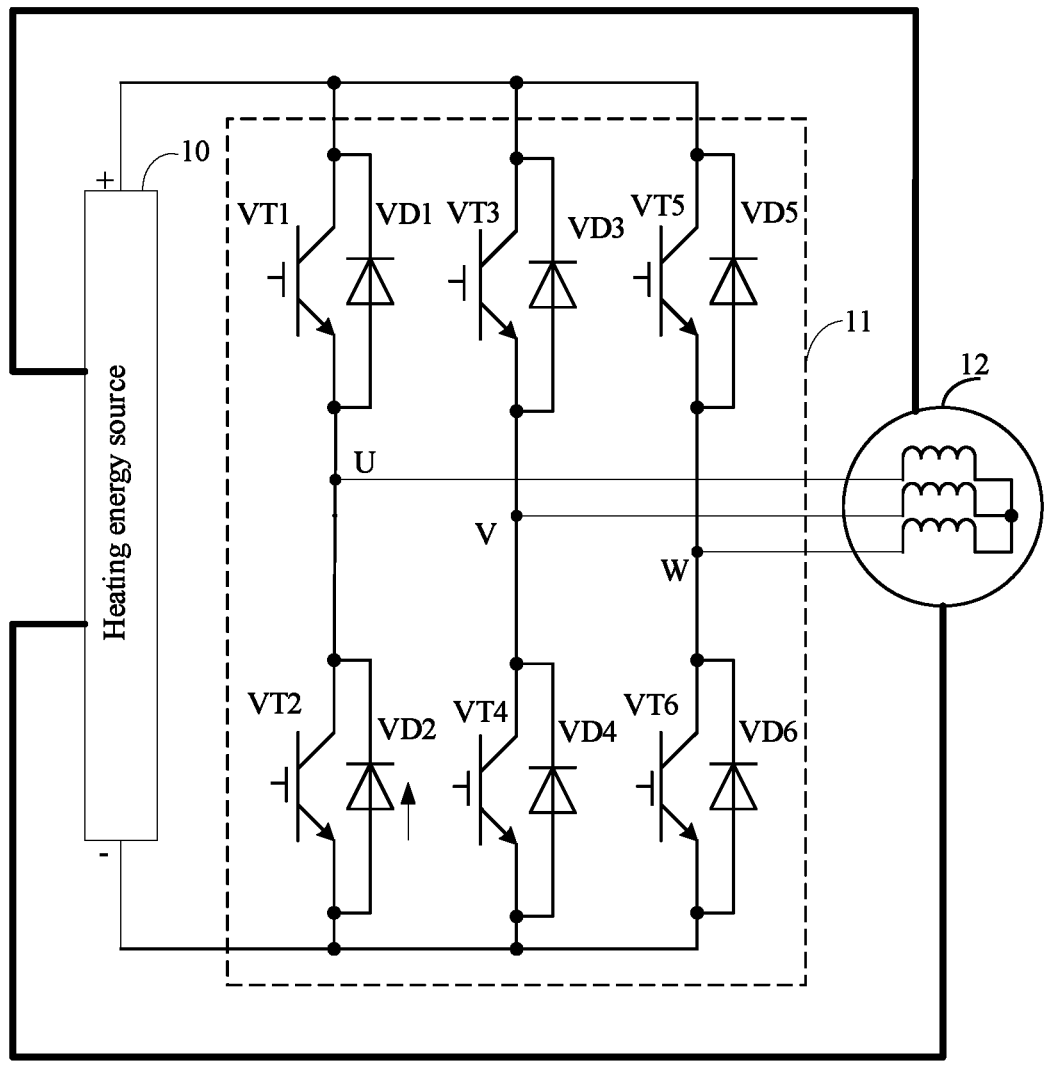
FIG. 3 is a circuit diagram of a power battery heating apparatus according to an embodiment of the present disclosure.

Specifically, in an implementation of the present disclosure, as shown in FIG. 3 (to help understand a working principle of a circuit, a portion of the control module 13 is omitted in FIG. 3), the three-phase inverter 11 includes a first power switching unit, a second power switching unit, a third power switching unit, a fourth power switching unit, a fifth power switching unit, and a sixth power switching unit. A control terminal of each power switching unit is connected to the control module 13 (not shown in the figure), first terminals of the first power switching unit, the third power switching unit, and the fifth power switching unit are connected together, and second terminals of the second power switching unit, the fourth power switching unit, and the sixth power switching unit are connected together. A first phase coil of the three-phase alternating current motor 12 is connected to a second terminal of the first power switching unit and a first terminal of the second power switching unit, a second phase coil of the three-phase alternating current motor 12 is connected to a second terminal of the third power switching unit and a first terminal of the fourth power switching unit, and a third phase coil of the three-phase alternating current motor 12 is connected to a second terminal of the fifth power switching unit and a first terminal of the sixth power switching unit.

Further, the first power switching unit and the second power switching unit in the three-phase inverter 11 form a first phase leg (U-phase leg), the third power switching unit and the fourth power switching unit form a second phase leg (V-phase leg), and an input terminal of the fifth power switching unit and the sixth power switching unit form a third phase leg (W-phase leg). The first power switching unit includes a first upper leg VT1 and a first upper diode VD1, the second power switching unit includes a second lower leg VT2 and a second lower diode VD2, the third power switching unit includes a third upper leg VT3 and a third upper diode VD3, the fourth power switching unit includes a fourth lower leg VT4 and a fourth lower diode VD4, the fifth power switching unit includes a fifth upper leg VT5 and a fifth upper diode VD5, and the sixth power switching unit includes a sixth lower leg VT6 and a sixth lower diode VD6. The three-phase alternating current motor 12 may be a permanent magnet synchronizing motor or an asynchronous motor, and the three phase coils of the motor are respectively connected to upper legs and lower legs of the U, V, and W phases in the three-phase inverter.

Further, in an implementation of the present disclosure, the control module 13 may include a vehicle control unit, a control circuit of a motor controller, and a battery management system (BMS) circuit, which are connected by using a CAN bus. Different modules in the control module 13 control, according to obtained information, switching-on and switching-off of switching units in the three-phase inverter 11, to implement conduction of different current loops. The heating energy source 10, the three-phase inverter 11, and the three-phase alternating current motor 12 are provided with an interworking coolant tube. A coolant flows through the coolant tube, and a temperature of the power battery may be adjusted by adjusting a temperature of the coolant in the coolant tube.

Figure 4:
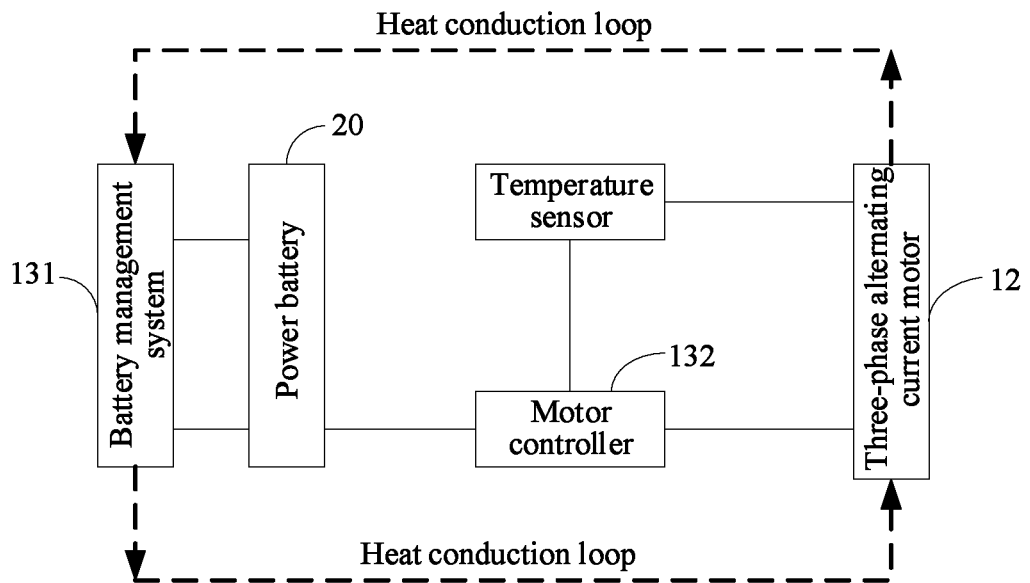
FIG. 4 is another structural diagram of a power battery heating apparatus according to an embodiment of the present disclosure.

During specific implementation, as shown in FIG. 4, the control module 13 includes a battery management system 131 and a motor controller 132. The battery management system 131 is connected to the power battery 20, and the motor controller 132 is connected to the power battery and the three-phase alternating current motor 12. The battery management system 131 obtains a temperature of the power battery, and compares the temperature of the power battery with a preset temperature value, to determine whether the power battery is in a low temperature state. When it is detected that the temperature of the power battery is lower than the preset temperature value, the temperature of the power battery may be raised by raising a temperature of a coolant flowing through the power battery. Because both the three-phase inverter 11 and the three-phase alternating current motor 12 generates heat during operation, the motor controller 132 may control the three-phase inverter 11 and the three-phase alternating current motor 12 to heat the coolant flowing through the power battery, and stop heating until it is detected that the temperature of the power battery reaches the preset temperature value.

Specifically, because both the three-phase inverter 11 and the three-phase alternating current motor 12 generates heat during operation, the motor controller 132 obtains a current working status of the motor of the vehicle, a fault status of the power battery, a fault status of the three-phase alternating current motor 12, a fault status of the motor controller 132, and a fault status of a heat conduction loop, and determines, according to the fault statuses and the current working status of the motor, whether a heating condition of the power battery is met.

It is identified that the heating condition of the power battery meets the preset condition, in a case of determining that the current working status of the motor is a non-driving state, and determining that the fault status of the power battery, the fault status of the three-phase alternating current motor, the fault status of the motor controller, and the fault status of the heat conduction loop all indicate that no fault exists; it is identified that the heating condition of the power battery does not meet the preset condition, in a case of determining that the current working status of the motor is a driving state, or determining that any fault status in the fault status of the power battery, the fault status of the three-phase alternating current motor, the fault status of the motor controller, and the fault status of the heat conduction loop indicates that there is a fault.

Further, in an implementation of the present disclosure, in a case of determining that any fault status in the fault status of the power battery, the fault status of the three-phase alternating current motor, the fault status of the motor controller, and the fault status of the heat conduction loop indicates that there is a fault, the motor controller 132 is further configured to set the preset direct-axis current id to zero.

In a case of determining that any fault status in the fault status of the power battery, the fault status of the three-phase alternating current motor, the fault status of the motor controller, and the fault status of the heat conduction loop indicates that there is a fault, the motor controller 132 is further configured to set the preset quadrature-axis current iq to zero.

Further, when obtaining the current working status of the motor, the motor controller 132 may first obtain gear position information and motor speed information, and obtain the current working status of the motor according to the gear position information and the motor speed information.

Specifically, when the motor controller 132 determines that a current gear position is a P gear position, and a motor speed is zero, it indicates that the current working status of the motor is a non-driving state; and when the motor controller 132 determines that the current gear position is not the P gear position, or the motor speed is not zero, it indicates that the current working status of the motor is a driving state. It should be noted that in the embodiments of the present disclosure, there is no sequence between two determining conditions of the working status of the motor and the temperature of the power battery.

In this implementation, when it is detected, in a parking state, that gear position information, motor speed information, and temperature information of the power battery meet a preset condition, the three-phase inverter 11 is controlled to cause the three-phase alternating current motor 12 to heat a coolant flowing through the power battery according to heating energy, to heat the power battery when the vehicle is in the parking state, facilitating that the vehicle may be normally started in a low temperature, and avoiding that the performance of the vehicle is affected because the power battery is heated when the vehicle is in a normal traveling state.

Specifically, referring to FIG. 3 and FIG. 4 together, when the motor controller 132 controls the three-phase inverter 11 and the three-phase alternating current motor 12 to heat the coolant flowing through the power battery, the motor controller 132 mainly controls an on/off time and a switching frequency of each power unit in the three-phase inverter 11, to cause the three-phase alternating current motor 12 to generate heat according to heating energy provided by the heating energy source 10 (in this embodiment, for example, the heating energy source is the power battery), to heat a coolant flowing through the power battery. In addition, the motor controller 132 controls, according to the preset direct-axis current id and the preset quadrature-axis current iq, the three-phase inverter 11 to adjust a phase current of the three-phase alternating current motor 12 in the heating process. It should be noted that in this implementation, the power battery is connected to and in communication with the heat conduction loop of the three-phase alternating current motor 12, and a cooling medium flows through a vehicle-used power battery (the power battery) and a vehicle-used power motor (the three-phase alternating current motor 12) by using a pump (not shown in the figure) and a communication valve (not shown in the figure).

In the process in which the motor controller 132 controls the three-phase inverter 11 to adjust the phase current of the three-phase alternating current motor 12, the preset direct-axis current id is a direct-axis current that is preset according to heating power, and the preset direct-axis current id may control the heating power, and has a periodically changing direction in the process of controlling the heating power. Specifically, as shown in FIG. 5, the heating process includes a plurality of heating periods, each heating period includes two preset heating durations t1 and t2, and two preset switching durations t3 and t4, the preset direct-axis current id is in a positive direction and has a constant amplitude value within the first preset heating duration t1, the preset direct-axis current id is in a negative direction and has a constant amplitude value within the second preset heating duration t2, the preset direct-axis current id changes from the positive direction to the negative direction and has a linearly changing amplitude value within the first preset switching duration t3, and the preset direct-axis current id changes from the negative direction to the positive direction and has a linearly changing amplitude value within the second preset switching duration t4. The first preset heating duration t1 is equal to the second preset heating duration t2, the first preset switching duration t3 is equal to the second preset switching duration t4, and the preset heating duration is greater than the preset switching duration. In the embodiments of the present disclosure, the preset heating duration is far greater than the preset switching duration, so that a direction of the preset direct-axis current id changes quickly during changing, to avoid an excessively large change in an amplitude value of the preset direct-axis current id, and a minimum preset switching duration needs to ensure that the vehicle has no obvious jitter. It should be noted that the preset heating duration is preset according to power required for heating a battery, and the preset switching duration is preset according to a case that it is ensured that the vehicle has no obvious jitter in the heating process of the battery, both of which are not specifically limited herein.

In the embodiments of the present disclosure, in the process of controlling the three-phase inverter 11 to adjust the phase current of the three-phase alternating current motor 12, the motor controller 132 controls the preset direct-axis current to have a constant current amplitude value and to alternately change between the positive direction and the negative direction within a preset heating duration, thereby making quantities of times of switching-on and switching-off of an upper leg and a lower leg of power switching devices of the same phase in the three-phase inverter 11 equal, and service life of devices balanced. In addition, it is set that the preset heating duration is far greater than the preset switching duration, which can effectively reduce a switching time during changing of a current direction, and effectively avoid a jitter of the vehicle while ensuring a heating effect.

Moreover, in the process in which the motor controller 132 controls the three-phase inverter 11 to adjust the phase current of the three-phase alternating current motor 12, the preset quadrature-axis current iq is a quadrature-axis current with a constant amplitude value, and the amplitude value is obtained through a large amount of experiments, so that electromagnetic torque with a relatively small torque value may be outputted at a motor shaft. The electromagnetic torque cannot cause the vehicle to move, and also cannot cause a damage to parts and components of a transmission mechanism of the vehicle. The electromagnetic torque only provides relatively small output torque to complete gap engagement of gears of the transmission mechanism of the vehicle or generate a pre-tightening force.

In this implementation, in the power battery heating apparatus provided in the embodiments of the present disclosure, the three-phase inverter 11 and the three-phase alternating current motor 12 are controlled to heat the coolant flowing through the power battery, and the preset direct-axis current is controlled according to required heating power in the heating process, so that the preset direct-axis current changes periodically in a process of adjusting the phase current of the three-phase alternating current motor, thereby making quantities of times of switching-on and switching-off of an upper leg and a lower leg of power switching devices of the same phase equal, and service life of devices balanced.

Further, in an implementation of the present disclosure, when the control module 13 controls the three-phase inverter 11 according to the preset direct-axis current id and the preset quadrature-axis current iq to adjust the phase current of the three-phase alternating current motor 12, the control module 13 needs to obtain a current three-phase current value and position and angle information of a motor rotor of the three-phase alternating current motor 12 before the power battery is heated, and convert the current three-phase current value into a direct-axis current and a quadrature-axis current according to the position and angle information of the motor rotor, so as to control the three-phase inverter 11 according to the direct-axis current, the quadrature-axis current, the preset direct-axis current, and the preset quadrature-axis current to adjust the phase current of the three-phase alternating current motor 12 in the heating process.

In this implementation, parameters such as a three-phase current value and position and angle information of a motor rotor of the three-phase alternating current motor before the heating are obtained, to obtain a direct-axis current and a quadrature-axis current according to the obtained parameters, facilitating in controlling the three-phase inverter according to the direct-axis current, the quadrature-axis current, the preset direct-axis current, and the preset quadrature-axis current to adjust the phase current of the three-phase alternating current motor in the heating process, making an amount of heat generated by windings of the three-phase alternating current motor constant.

Figure 6:
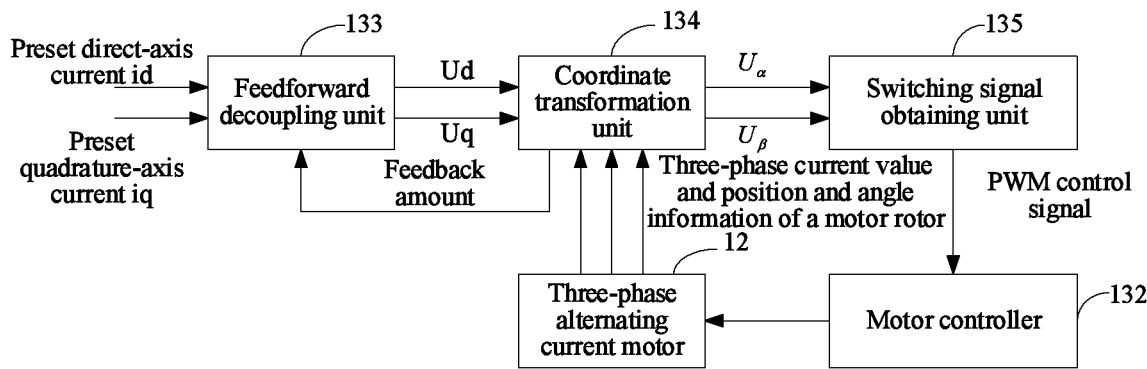
FIG. 6 is a structural diagram of a control module of a power battery heating apparatus according to an embodiment of the present disclosure.

Further, in an implementation of the present disclosure, as shown in FIG. 6, the control module 13 further includes a feedforward decoupling unit 133, a coordinate transformation unit 134, and a switching signal obtaining unit 135. The feedforward decoupling unit 133 is connected to the coordinate transformation unit 134, the coordinate transformation unit 134 is connected to the switching signal obtaining unit 135 and the three-phase alternating current motor 12, the switching signal obtaining unit 135 is connected to the motor controller 132, and the motor controller 132 is connected to the three-phase alternating current motor 12.

Specifically, after obtaining the direct-axis current and the quadrature-axis current, the control module 13 respectively compares the direct-axis current and the quadrature-axis current with the preset direct-axis current id and the preset quadrature-axis current iq, to adjust the direct-axis current and the quadrature-axis current according to the preset direct-axis current id and the preset quadrature-axis current iq, thereby controlling the three-phase inverter according to the preset direct-axis current id and the preset quadrature-axis current iq. After the direct-axis current and the quadrature-axis current are adjusted according to the preset direct-axis current id and the preset quadrature-axis current iq, an adjustment result is outputted to the feedforward decoupling unit 133. The feedforward decoupling unit 133 decouples the comparison result to obtain a direct-axis voltage Ud and a quadrature-axis voltage Uq. The coordinate transformation unit 134 performs coordinate transformation on the direct-axis voltage Ud and the quadrature-axis voltage Uq to obtain a first voltage $U_\alpha$ and a second voltage $U_\beta$. The switching signal obtaining unit 135 obtains a switching signal according to the first voltage $U_\alpha$ and the second voltage $U_\beta$. The motor controller 132 controls the three-phase inverter 11 according to the switching signal to adjust the phase current of the three-phase alternating current motor 12.

In this implementation, the obtained direct-axis current and quadrature-axis current are adjusted according to the preset direct-axis current and the preset quadrature-axis current, to obtain a corresponding adjustment result, and a series of changes are performed on the adjustment result, to obtain a switching signal of the three-phase inverter, so that the motor controller controls the three-phase inverter according to the switching signal to adjust the phase current of the three-phase alternating current motor, thereby implementing closed-loop controlling of the three-phase alternating current motor, and adjusting the heating power, which improves the effectiveness in the heating process of the power battery, and reduces a loss in parts and components such as the motor.

Figure 7:
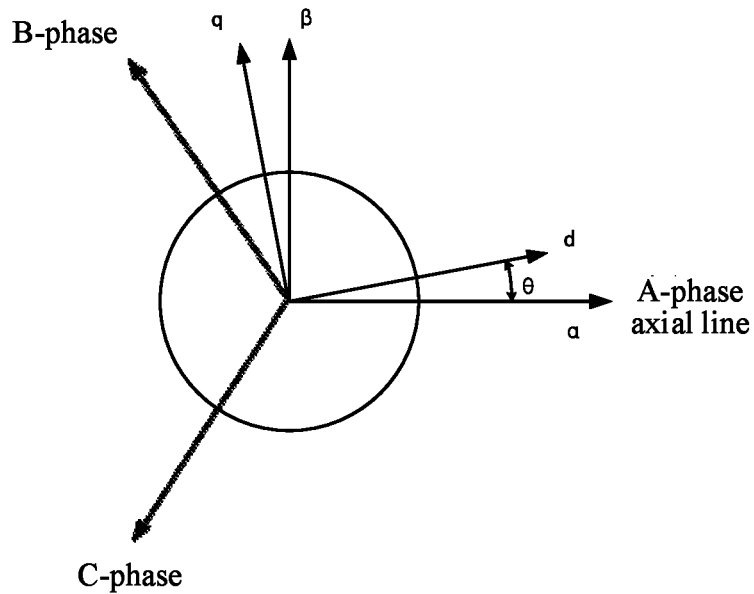
FIG. 7 is a schematic diagram of coordinate transformation in a power battery heating apparatus according to an embodiment of the present disclosure.
Figure 8:
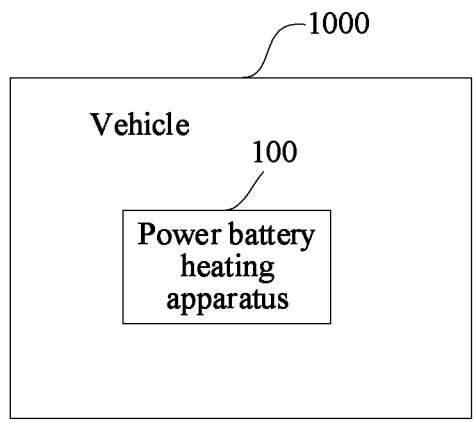
FIG. 8 is a schematic block diagram of a vehicle according to an embodiment of the present disclosure.

Further, in an implementation of the present disclosure, a specific process in which the control module 13 obtains the direct-axis current and the quadrature-axis current according to the position and angle information of the motor rotor and the feedforward decoupling unit the current three-phase current value is:

after the control module 13 obtains the current three-phase current value and the position and angle information of the motor rotor of the three-phase alternating current motor before the power battery is heated, transforming, by the coordinate transformation unit 134, the current three-phase current value from a natural coordinate system to a static coordinate system, and converting the current three-phase alternating current value in the static coordinate system into a direct-axis current and a quadrature-axis current in a synchronous rotating coordinate system according to the position and angle information of the motor rotor (as shown in FIG. 7).

In this implementation, the current three-phase current value is transformed from a natural coordinate system to a static coordinate system, and the current three-phase alternating current value in the static coordinate system is converted into a direct-axis current and a quadrature-axis current in a synchronous rotating coordinate system according to the position and angle information of the motor rotor, so that the control module controls the three-phase inverter according to the obtained direct-axis current and quadrature-axis current to adjust the phase current of the three-phase alternating current motor based on the standard of the same coordinate system, thereby improving the accuracy of the adjustment process.

Further, in an implementation of the present disclosure, as shown in FIG. 4, the power battery heating apparatus is further provided with a temperature monitoring unit. The temperature monitoring unit is connected to the motor controller 132 in the control module and the three-phase alternating current motor 12. The temperature monitoring unit is configured to monitor temperatures of the three-phase inverter 11 and the three-phase alternating current motor 12 in real time in the heating process of the power battery, and feed back a result of monitoring to the control module 13. If a temperature of either of the three-phase inverter 11 and the three-phase alternating current motor 12 exceeds a temperature limit value, the control module 13 reduces the preset direct-axis current id, or sets the preset direct-axis current id to zero.

If the temperature of either of the three-phase inverter 11 and the three-phase alternating current motor 12 exceeds the temperature limit value, the control module 13 is further configured to set the preset quadrature-axis current iq to zero.

During specific implementation, the temperature monitoring unit is implemented by using a temperature sensor. The temperature sensor may be implemented by using a negative temperature coefficient thermistor, or may be implemented by using a positive temperature coefficient thermistor, which is not specifically limited herein.

In the embodiments of the present disclosure, in the heating process of the power battery, any device may be damaged in a case of an excessively high temperature. Therefore, temperatures of the three-phase alternating current motor and the power device in the three-phase inverter need to be monitored in real time. If it is detected that a temperature of either of the three-phase inverter and the three-phase alternating current motor exceeds a temperature threshold, a current amplitude value of the preset direct-axis current id is reduced or the preset direct-axis current id and the preset quadrature-axis current iq are set to zero.

In this implementation, in the heating process of the power battery, temperatures of the three-phase inverter and the three-phase alternating current motor are monitored in real time, so that when a temperature of either of the three-phase inverter and the three-phase alternating current motor exceeds a temperature threshold, the preset direct-axis current id is reduced, or the preset direct-axis current id and the preset quadrature-axis current iq are set to zero, and values of phase currents flowing through three phase windings of the three-phase alternating current motor are also reduced or become zero. In this way, the heating power of the motor is reduced, and thus a temperature of a power unit in the three-phase inverter and temperatures of the three phase windings of the three-phase alternating current motor are reduced, so that all the parts and components of the vehicle are not damaged while ensuring the heating effect.

Further, in an implementation of the present disclosure, the control module is further configured to monitor a temperature of the power battery in real time in the heating process of the power battery, and stop heating the power battery if the temperature of the power battery reaches a specified heating temperature.

In the embodiments of the present disclosure, when a temperature of the power battery reaches a specified heating temperature, it indicates that there is no need to heat the power battery. In this case, it needs to stop heating the power battery, that is, reduce a direct-axis current and a quadrature-axis current.

In this implementation, a temperature of the power battery is monitored in real time in the heating process, and when the temperature of the power battery reaches a specified heating temperature, the preset direct-axis current and the preset quadrature-axis current are reduced, to effectively avoid overheating of the power battery, and avoid a damage to the power battery, thereby prolonging the service life of the power battery.

Further, in an implementation of the present disclosure, the control module 13 is further configured to obtain required heating power of the power battery in real time in the heating process of the power battery, and adjust a value of the preset direct-axis current id according to the required heating power.

In the embodiments of the present disclosure, as the heating process goes on, the temperature of the power battery constantly rises, and the rising of the temperature causes heating power required by the power battery to change constantly. Therefore, in the heating process of the power battery, required heating power of the power battery needs to be obtained in real time, and a value of the preset direct-axis current id needs to be adjusted according to the required heating power.

In this implementation, required heating power of the power battery is obtained in real time in the heating process, and the preset direct-axis current id is adjusted according to the required heating power, to effectively avoid overheating of the power battery, and avoid a damage to the power battery, thereby prolonging the service life of the power battery.

The technical solutions of the present disclosure are described below by using specific circuit structures.

in a cold environment, when the vehicle is not used for a long time, a temperature of a vehicle-used power battery approaches an ambient temperature. With the decrease of the temperature, the performance of the vehicle-used power battery is further reduced, limiting charging and discharging capabilities, and further affecting the performance and use of the new-energy vehicle. Therefore, the power battery needs to be heated.

Referring to FIG. 3 and FIG. 4 together, during heating of the power battery, when the battery management system 131 monitors that the temperature of the power battery is excessively low, a standby state at which the three-phase alternating current motor 12 heats the power battery is entered. In this case, the control module 13 needs to determine a heating condition, that is, determines whether the temperature of the power battery is excessively low, whether a motor speed is zero, and whether a gear position is a P gear position. If all determination results of the heating condition are true, a process of generating heat by using the three-phase alternating current motor 12 to heat the power battery may be performed.

During heating, a sensor first performs signal sampling on each current variable of the motor, and transmits a sampling result to the control module 13. Sampled variables are mainly a three-phase current value that currently flows through windings of the three-phase alternating current motor 12 and position and angle information of a motor rotor (a current rotor position of the motor). As shown in FIG. 6, after the three-phase current value and the position and angle information of the motor rotor are obtained, the coordinate transformation unit 134 converts variables in a natural coordinate system ABC into variables in a static coordinate system α-β through clark transformation, and then converts the variables in the static coordinate system α-β into variables in a synchronous rotating coordinate system d-q through park transformation. In addition, a condition that an amplitude value is constant is followed in the entire coordinate transformation, and a transformation coefficient 2/3 is added in front of a transformation matrix.

Specifically, when the coordinate transformation unit 134 converts the variables in the natural coordinate system ABC into the variables in the static coordinate system α-β, the variables in the natural coordinate system ABC is converted according to a transformation matrix $$T_{3s/2s} = \frac{2}{3}\begin{bmatrix} 1 & -0.5 & -0.5 \\ 0 & \frac{\sqrt{3}}{2} & -\frac{\sqrt{3}}{2} \\ \frac{\sqrt{2}}{2} & \frac{\sqrt{2}}{2} & \frac{\sqrt{2}}{2} \end{bmatrix}.$$

When the coordinate transformation unit 134 converts the variables in the static coordinate system α-β into the variables in the synchronous rotating coordinate system d-q, the variables in the static coordinate system α-β is converted according to a transformation matrix $$T_{2s/2r} = \begin{bmatrix} \cos\theta & \sin\theta \\ -\sin\theta & \cos\theta \end{bmatrix}.$$

Then, the two transformation matrices are multiplied, to obtain a transformation matrix $$T_{3s/2r} = \frac{2}{3}\begin{bmatrix} \cos\theta & -\sin\theta & 0.5 \\ \cos\left(\theta - \frac{2}{3}\pi\right) & -\sin\left(\theta - \frac{2}{3}\pi\right) & 0.5 \\ \cos\left(\theta + \frac{2}{3}\pi\right) & -\sin\left(\theta + \frac{2}{3}\pi\right) & 0.5 \end{bmatrix}$$

from the natural coordinate system ABC to the synchronous rotating coordinate system d-q. θ in the formula is an angle (the position and angle information of the motor rotor) between a direct rotor axis of the three-phase alternating current motor 12 and an A-phase winding of the three-phase alternating current motor 12. A three-phase current in the natural coordinate system ABC may be converted into a quadrature-axis current and a direct-axis current through the transformation matrix $T_{3s/2r}$. The direct-axis current is an exciting current, and the quadrature-axis current is a torque current, that is, only the quadrature-axis current is related to torque outputted at a motor shaft. Therefore, in the process of heating the power battery by using the three-phase alternating current motor 12, output of torque at the motor shaft may be controlled by controlling the quadrature-axis current.

It may be seen according to a calculation formula $$T_e = \frac{3}{2} p \cdot i_q [\varphi_f + (L_d - L_q) \cdot i_d]$$

of torque outputted at the motor shaft of the three-phase alternating current motor 12 that, when a quadrature-axis current iq is equal to zero, there is no torque outputted by the motor shaft. However, during actual use, to control the quadrature-axis current to be zero, that is, to not generate electromagnetic torque of the motor, a zero position of the motor needs to be accurately obtained, and a sampling precision of a three-phase current sensor needs to be ensured. Limited to factors such as the accuracy of a motor zero position calibration method and the difficulty in ensuring a good sampling precision of the three-phase current sensor when a current amplitude value is relatively small, if the zero position of the motor is inaccurate, or a good sampling precision of the three-phase current sensor is difficult to be ensured when a current amplitude value is relatively small, a control algorithm cannot control the quadrature-axis current to be always zero, and thus a quadrature-axis current value fluctuates around zero, making the entire vehicle jitter. In different working conditions, jitter strength is also different. If there is an occupant in the vehicle at this time, a bad driving feeling is generated. To eliminate such a defect, in the present disclosure, an amplitude value of the preset direct-axis current id is controlled in real time to be a value corresponding to required heating power, and a direction of the current is periodically changed. In addition, an amplitude value of the preset quadrature-axis current iq is controlled to be an appropriate constant value. The value cannot make the occupant feel that the vehicle is moving or jittering, nor cause a potential damage to the transmission mechanism of the vehicle, but only torque with a relatively small amplitude value is outputted at a motor shaft, which falls within an acceptable range of the mechanical strength of the transmission mechanism. In this way, an effect similar to a pre-tightening force is to be generated, eliminating an engagement gap between transmission mechanisms. Therefore, it may be ensured that the occupant feels good, and the vehicle normally completes heating of the power battery. $T_e$ indicates torque outputted at the motor shaft, p indicates a quantity of pole pairs, $\varphi_f$ indicates a permanent magnet flux linkage of the motor, $L_d$ indicates a direct-axis inductance, $L_q$ indicates a quadrature-axis inductance, $i_d$ indicates a direct-axis current, and $i_q$ indicates a quadrature-axis current.

In addition, to avoid the problem that service life of devices are uneven caused because quantities of times of switching-on and switching-off of power switches of legs of the same phase in the three-phase inverter 11 are not equal, when the phase current of the three-phase alternating current motor 12 is adjusted, the power battery heating apparatus provided in the embodiments of the present disclosure provides a preset direct-axis current having a periodically changing direction. For the preset direct-axis current, within a period, the current is in a positive direction within a first half period, and the current is in a negative direction within a second half period (it should be noted that switching times of the direction of the current within the first half period and the second half period are negligible herein), thereby making quantities of times of switching-on and switching-off of an upper leg and a lower leg of power switching devices of the same phase in the three-phase inverter 11 equal, and service life of devices balanced.

Further, after a direct-axis current and a quadrature-axis current are obtained by performing coordinate transformation on acquired variables, the direct-axis current and the quadrature-axis current may be respectively compared with the preset direct-axis current id and the preset quadrature-axis current iq, and a comparison result is fed back to the feedforward decoupling unit 133. The feedforward decoupling unit 133 performs complete decoupling on the variables in a feedforward compensation manner. After the decoupling is completed, an obtained direct-axis voltage (Ud) and quadrature-axis voltage (Uq) are further transmitted to the coordinate transformation unit 134, and voltage variables $U_\alpha$ and $U_\beta$ in a static coordinate system are obtained by using an inversed park transformation matrix $$T_{2r/2s} = \begin{bmatrix} \cos\theta & -\sin\theta \\ \sin\theta & \cos\theta \end{bmatrix}.$$

Subsequently, $U_\alpha$ and $U_\beta$ are transmitted to the switching signal obtaining unit 135, and the switching signal obtaining unit 134 obtains, by using a space vector pulse width modulation (SVPWM) algorithm, six switching signals for controlling the three-phase inverter 11. The motor controller 132 controls, by using the six switching signals, power switching devices in the three-phase inverter 11 to perform on/off actions, so as to control a three-phase current value flowing through the three-phase alternating current motor.

Further, in the entire heating process, a temperature sensor constantly monitors temperatures of windings of the three-phase alternating current motor and power switches of the three-phase inverter. If any of them exceeds a temperature limit value, or a current temperature of the power battery gradually approaches a pre-determined target heating temperature, or the current temperature of the power battery has reached or exceeds the pre-determined target heating temperature, the motor controller reduces the given id value or sets id or iq to zero. Therefore, values of phase currents flowing through three phase windings of the three-phase alternating current motor are also reduced or become zero, and heating power of the motor is also reduced, so that temperatures of the power switches of the three-phase inverter and temperatures of the windings of the three-phase alternating current motor are also reduced. Therefore, all parts and components of the vehicle are not damaged while ensuring the heating effect, until the windings of the three-phase alternating current motor and the power switches of the three-phase inverter are not in an over-temperature state.

In this case, if the temperature of the power battery has reached the pre-determined heating temperature, heating is stopped; and if the temperature of the power battery has not reached the pre-determined heating temperature, heating continues to be performed. If in the entire heating process, the windings of the three-phase alternating current motor and the power switching devices are not in an over-temperature state, the battery management system transmits a heating stop instruction when monitoring that the temperature of the battery has reached the pre-determined heating temperature. In this case, the process in which the three-phase alternating current motor generates heat to heat the vehicle-used power battery ends.

Another embodiment of the present disclosure provides a vehicle 1000. The vehicle 1000 includes the power battery heating apparatus 100 in the foregoing embodiment, and further includes a power battery, a coolant tank, a pump, and a water pipeline, the pump inputs a coolant in the coolant tank into the water pipeline according to a control signal, and the water pipeline passes through the power battery and the power battery heating apparatus 100.

In the vehicle provided in the present disclosure, when a current temperature value of a power battery is lower than a preset temperature value, and a heating condition of the power battery meets a preset condition, a three-phase inverter is controlled to cause a three-phase alternating current motor to generate heat according to heating energy, to heat a coolant flowing through the power battery, a preset quadrature-axis current that causes a torque value outputted by the motor to be an appropriate value is obtained, and a corresponding preset direct-axis current is obtained according to heating power of the power battery, so as to control, according to the preset direct-axis current and the preset quadrature-axis current, the three-phase inverter to adjust a phase current of the three-phase alternating current motor in the heating process, where a direction of the preset direct-axis current changes periodically in the heating process, thereby making quantities of times of switching-on and switching-off of an upper leg and a lower leg of power switching devices of the same phase equal, and service life of devices balanced.

The foregoing embodiments are merely used for describing the technical solutions of the present disclosure, but are not intended to limit the present disclosure. Although the present disclosure is described in detail with reference to the foregoing embodiments, a person of ordinary skill in the art should understand that, modifications may still be made to the technical solutions in the foregoing embodiments, or equivalent replacements may be made to some of the technical features; and these modifications or replacements will not cause the essence of corresponding technical solutions to depart from the spirit and scope of the technical solutions in the embodiments of the present disclosure, and shall fall within the protection scope of the present disclosure.

What is claimed is:

1. A power battery heating method, configured for heating a power battery of a vehicle, the power battery heating method comprising:
   obtaining a current temperature value of the power battery, and determining that the current temperature value of the power battery is lower than a preset temperature value;
   obtaining heating power of the power battery;
   obtaining a preset quadrature-axis current, and obtaining a corresponding preset direct-axis current according to the heating power of the power battery, wherein a value of the obtained preset quadrature-axis current is a quadrature-axis current value that causes a torque value outputted by a three-phase alternating current motor to fall within a target range, and zero is not comprised in the target range; and
   controlling an on/off status of a power device in a three-phase inverter, so that the three-phase alternating current motor generates heat according to heating energy provided by a heating energy source, to heat a coolant flowing through the power battery, and controlling, according to the preset direct-axis current and the preset quadrature-axis current, the three-phase inverter to adjust a phase current of the three-phase alternating current motor in the heating process, wherein a direction of the preset direct-axis current changes periodically in the heating process.

2. The power battery heating method according to claim 1, wherein the heating process comprises a plurality of heating periods, each heating period comprises two preset heating durations and two preset switching durations, the preset direct-axis current is in a positive direction and has a constant amplitude value within the first preset heating duration, the preset direct-axis current is in a negative direction and has a constant amplitude value within the second preset heating duration, the preset direct-axis current changes from the positive direction to the negative direction and has a constantly changing amplitude value within the first preset switching duration, and the preset direct-axis current changes from the negative direction to the positive direction and has a constantly changing amplitude value within the second preset switching duration; and the preset heating duration is greater than the preset switching duration.

3. The power battery heating method according to claim 1, wherein before the obtaining heating power of the power battery, the method further comprises: determining whether a heating condition of the power battery meets a preset condition; and the determining whether a heating condition of the power battery meets a preset condition comprises:
   identifying that the heating condition of the power battery meets the preset condition, in a case of determining that a current working status of the motor is a non-driving state, and determining that a fault status of the power battery, a fault status of the three-phase alternating current motor, a fault status of a motor controller, and a fault status of a heat conduction loop all indicate that no fault exists; and
   identifying that the heating condition of the power battery does not meet the preset condition, in a case of determining that the current working status of the motor is a driving state, or determining that any fault status in the fault status of the power battery, the fault status of the three-phase alternating current motor, the fault status of the motor controller, and the fault status of the heat conduction loop indicates that there is a fault.

4. The power battery heating method according to claim 3, further comprising:
   obtaining gear position information and motor speed information, and obtaining the current working status of the motor according to the gear position information and the motor speed information.

5. The power battery heating method according to claim 3, further comprising:
   setting the preset direct-axis current to zero in a case of determining that any fault status in the fault status of the power battery, the fault status of the three-phase alternating current motor, the fault status of the motor controller, and the fault status of the heat conduction loop indicates that there is a fault.

6. The power battery heating method according to claim 5, wherein in a case of determining that any fault status in the fault status of the power battery, the fault status of the three-phase alternating current motor, the fault status of the motor controller, and the fault status of the heat conduction loop indicates that there is a fault, the power battery heating method further comprises:
setting the preset quadrature-axis current to zero.

7. The power battery heating method according to claim 1, further comprising:
monitoring temperatures of the three-phase inverter and the three-phase alternating current motor in the heating process of the power battery, and if a temperature of either of the three-phase inverter and the three-phase alternating current motor exceeds a temperature limit value, reducing the preset direct-axis current, or setting the preset direct-axis current to zero.

8. The power battery heating method according to claim 7, wherein if the temperature of either of the three-phase inverter and the three-phase alternating current motor exceeds the temperature limit value, the power battery heating method further comprises:
setting the preset quadrature-axis current to zero.

9. The power battery heating method according to claim 1, further comprising:
monitoring a temperature of the power battery in the heating process of the power battery, and reducing the preset direct-axis current if the temperature of the power battery reaches a specified heating temperature.

10. The power battery heating method according to claim 1, further comprising:
obtaining a current three-phase current value and position and angle information of a motor rotor of the three-phase alternating current motor before the power battery is heated, and converting the current three-phase current value into a direct-axis current and a quadrature-axis current according to the position and angle information of the motor rotor.

11. The power battery heating method according to claim 1, wherein the heating energy source is at least one of an external charging device and the power battery.

12. A power battery heating apparatus, for heating a power battery of a vehicle, the power battery heating apparatus comprising:
a three-phase inverter, connected to a positive electrode and a negative electrode of a heating energy source configured to provide heating energy;
a three-phase alternating current motor, wherein three phase coils of the three-phase alternating current motor are connected to three phase legs of the three-phase inverter; and
a controller, wherein the controller is respectively connected to the three-phase inverter and the three-phase alternating current motor, and is programmed to obtain a current temperature value of the power battery, and determine that the current temperature value of the power battery is lower than a preset temperature value, and obtain heating power of the power battery; the controller is further programmed to obtain a preset quadrature-axis current, and obtain a corresponding preset direct-axis current according to the heating power of the power battery, wherein a value of the obtained preset quadrature-axis current is a quadrature-axis current value that causes a torque value outputted by the three-phase alternating current motor to fall within a target range, and zero is not comprised in the target range; and
the controller is further programmed to control an on/off status of a power device in the three-phase inverter, so that the three-phase alternating current motor generates heat according to the heating energy provided by the heating energy source, to heat a coolant flowing through the power battery, and control, according to the preset direct-axis current and the preset quadrature-axis current, the three-phase inverter to adjust a phase current of the three-phase alternating current motor in the heating process, wherein a direction of the preset direct-axis current changes periodically in the heating process.

13. The power battery heating apparatus according to claim 12, wherein the heating process comprises a plurality of heating periods, each heating period comprises two preset heating durations and two preset switching durations, the preset direct-axis current is in a positive direction and has a constant amplitude value within the first preset heating duration, the preset direct-axis current is in a negative direction and has a constant amplitude value within the second preset heating duration, the preset direct-axis current changes from the positive direction to the negative direction and has a constantly changing amplitude value within the first preset switching duration, and the preset direct-axis current changes from the negative direction to the positive direction and has a constantly changing amplitude value within the second preset switching duration; and the preset heating duration is greater than the preset switching duration.

14. The power battery heating apparatus according to claim 12, wherein the controller is further programmed to determine whether a heating condition of the power battery meets a preset condition;
identify that the heating condition of the power battery meets the preset condition, in a case of determining that a current working status of the motor is a non-driving state, and determining that a fault status of the power battery, a fault status of the three-phase alternating current motor, a fault status of a motor controller, and a fault status of a heat conduction loop all indicate that no fault exists; and
identify that the heating condition of the power battery does not meet the preset condition, in a case of determining that the current working status of the motor is a driving state, or determining that any fault status in the fault status of the power battery, the fault status of the three-phase alternating current motor, the fault status of the motor controller, and the fault status of the heat conduction loop indicates that there is a fault.

15. The power battery heating apparatus according to claim 14, wherein the controller is specifically programmed to:
obtain gear position information and motor speed information, and obtain the current working status of the motor according to the gear position information and the motor speed information.

16. The power battery heating apparatus according to claim 14, wherein the controller is specifically programmed to:
set the preset direct-axis current to zero in a case of determining that any fault status in the fault status of the power battery, the fault status of the three-phase alternating current motor, the fault status of the motor controller, and the fault status of the heat conduction loop indicates that there is a fault.

17. The power battery heating apparatus according to claim 12, further comprising:
a temperature monitoring unit, wherein the temperature monitoring unit is connected to the controller and the three-phase alternating current motor, and is configured to monitor temperatures of the three-phase inverter and the three-phase alternating current motor in the heating process of the power battery, and feed back a result of monitoring to the controller, and if a temperature of either of the three-phase inverter and the three-phase alternating current motor exceeds a temperature limit value, the controller reduces the preset direct-axis current, or sets the preset direct-axis current to zero.

18. The power battery heating apparatus according to claim 12, wherein the controller is further programmed to:
monitor a temperature of the power battery in the heating process of the power battery, and reduce the preset direct-axis current if the temperature of the power battery reaches a specified heating temperature.

19. The power battery heating apparatus according to claim 12, wherein the controller is further programmed to:
obtain a current three-phase current value and position and angle information of a motor rotor of the three-phase alternating current motor before the power battery is heated, and convert the current three-phase current value into a direct-axis current and a quadrature-axis current according to the position and angle information of the motor rotor.

20. A vehicle, comprising:
a power battery, a coolant tank, a pump, and a water pipeline, wherein the pump inputs a coolant in the coolant tank into the water pipeline according to a control signal, and
a power battery heating apparatus, comprising:
a three-phase inverter, connected to a positive electrode and a negative electrode of a heating energy source configured to provide heating energy;
a three-phase alternating current motor, wherein three phase coils of the three-phase alternating current motor are connected to three phase legs of the three-phase inverter; and
a controller, wherein the controller is respectively connected to the three-phase inverter and the three-phase alternating current motor, and is programmed to obtain a current temperature value of the power battery, and determine that the current temperature value of the power battery is lower than a preset temperature value, and obtain heating power of the power battery; the controller is further programmed to obtain a preset quadrature-axis current, and obtain a corresponding preset direct-axis current according to the heating power of the power battery, wherein a value of the obtained preset quadrature-axis current is a quadrature-axis current value that causes a torque value outputted by the three-phase alternating current motor to fall within a target range, and zero is not comprised in the target range; and the controller is further programmed to control an on/off status of a power device in the three-phase inverter, so that the three-phase alternating current motor generates heat according to the heating energy provided by the heating energy source, to heat a coolant flowing through the power battery, and control, according to the preset direct-axis current and the preset quadrature-axis current, the three-phase inverter to adjust a phase current of the three-phase alternating current motor in the heating process, wherein a direction of the preset direct-axis current changes periodically in the heating process,
wherein the water pipeline passes through the power battery and the power battery heating apparatus.

* * * * *